(12) United States Patent
Hirahara et al.

(10) Patent No.: US 6,234,423 B1
(45) Date of Patent: May 22, 2001

(54) COMPOSITE AIRFOIL STRUCTURES AND THEIR FORMING METHODS

(75) Inventors: Makoto Hirahara; Yasuo Isano; Ryuhei Shimizu; Kazuaki Amaoka, all of Tokyo-To (JP)

(73) Assignee: Japan Aircraft Development Corporation, Tokyo-To (JP)

( * ) Notice: Subject to any disclaimer, the term of this patent is extended or adjusted under 35 U.S.C. 154(b) by 0 days.

(21) Appl. No.: 09/363,396

(22) Filed: Jul. 29, 1999

(30) Foreign Application Priority Data

Jul. 30, 1998 (JP) ................................... 10-215413

(51) Int. Cl.[7] ....................................................... B64C 3/20
(52) U.S. Cl. .......................... 244/123; 416/226; 416/230; 244/133
(58) Field of Search ............................ 244/117 R, 123, 244/133, 131; 416/230, 226, 241 A; 156/245, 182; 29/889.71, 889.61, 889.6

(56) References Cited

U.S. PATENT DOCUMENTS

| 3,768,760 | * | 10/1973 | Jensen | 244/123 |
| 3,775,238 | * | 11/1973 | Lyman | 156/242 |
| 3,995,080 | * | 11/1976 | Cogburn et al. | 244/123 |
| 4,009,067 | * | 2/1977 | Rogers | 156/245 |
| 4,095,322 | * | 6/1978 | Scarpati et al. | 416/230 |
| 5,041,182 | * | 8/1991 | Sekiguchi et al. | 156/245 |
| 5,224,670 | * | 7/1993 | Padden | 244/123 |
| 5,476,704 | * | 12/1995 | Kohler | 244/123 |

\* cited by examiner

*Primary Examiner*—Galen L. Barefoot
(74) *Attorney, Agent, or Firm*—Smith, Gambrell & Russell, LLP

(57) ABSTRACT

A box-structure airfoil is constructed of a composite material upper skin, a composite material lower skin 12 and a spar. Ribs and an elongate projection are formed integrally on the inner surface of each of the two skins. The upper and lower skins and the spar are simultaneously bonded by an adhesive to form a single structure. Since the ribs and the elongate projection are one-piece formed with each skin, it is possible to reduce the number of principal constituent components. Furthermore, since assembly operation is made by using the adhesive, there is no need for fasteners or the like for assembling. Moreover, the spar is bonded not only to Moreover, because not only a web but also flanges on both sides of the spar are bonded to the respective skins, it is possible to obtain a large strength. According to the invention, it is possible to reduce the number of principal constituent components and that of assembling components of an airfoil, thereby achieving its cost reduction.

7 Claims, 13 Drawing Sheets

FIG. 22 (a) PRIOR ART
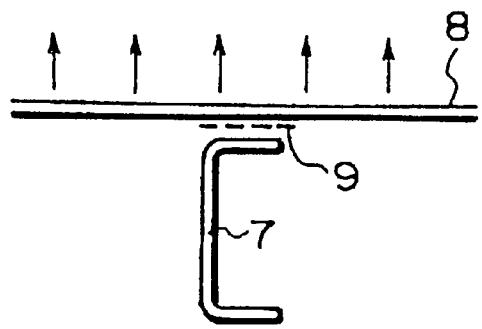
FIG. 22 (b) PRIOR ART
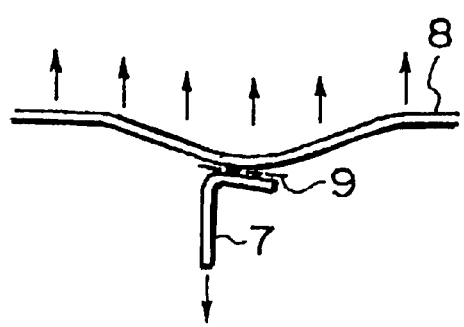
FIG. 23 (a) PRIOR ART
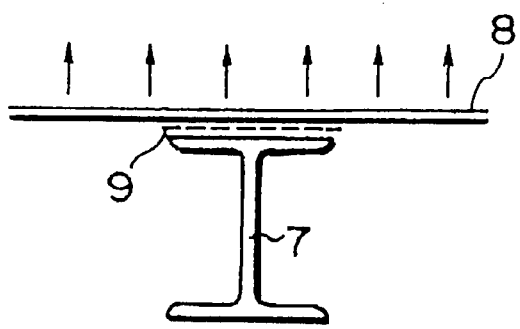
FIG. 23 (b) PRIOR ART
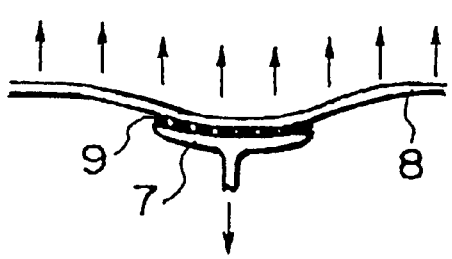

COMPOSITE AIRFOIL STRUCTURES AND THEIR FORMING METHODS

BACKGROUND OF THE INVENTION

1. Field of the Invention

The present invention pertains to airfoil structures of composite material used in part of an aircraft elevator or wing, for example, as well as to methods of forming such airfoil structures. More particularly, the invention relates to airfoil structures of composite material which are easy to manufacture and provide a high peeling strength as well as to their forming methods.

2. Description of the Related Art

FIGS. 19 to 21 show an elevator surface structure of a related art aircraft using composite materials, in which the aircraft's elevator 1 is constructed by individually forming an upper skin 2, a lower skin 3, a spar 4 and ribs 5 using the composite materials and, then, assembling them by use of fastener means 6, such as bolts and nuts.

The related art aircraft elevator 1 has such problems that it involves a large number of principal constituent components, requiring high manufacturing costs for those components, and because they need to be assembled by using a number of fasteners, assembling component costs are also high. A further problem is that it is necessary to make many holes for fitting the fasteners, resulting in an increase in man-hours required for assembly work.

Box-structure airfoils in which a frame is produced by previously fastening spars and ribs with clips to reduce the man-hours required for assembly with fasteners and upper and lower skins are bonded to the frame are disclosed in European Patent Bulletin Publication No. 485027 and published U.S. Pat. No. 5,216,799, for example.

Although it has been attempted to reduce the number of fasteners and the man-hours required for assembly by assembling the individual skins by bonding in the aforementioned box-structure airfoil, the number of components is not actually reduced because the principal components have the same construction as those of the related art. Further, as it is necessary to previously join the spars and ribs with fasteners and then adjust mating surfaces by machining flange surfaces of the spars and ribs after frame assembly, there arises a problem that man-hour requirements are increased.

Also, structures shown in FIGS. 22 and 23 in which a frame 7 and a skin 8 are bonded by using an adhesive 9 have a low out-of-plane peeling load (peeling load exerted in a direction perpendicular to the skin 8) compared to fastener assembly, and this would pose a problem related to strength.

Although it is advantageous for improving the peeling strength if the frame 7 has an I-shaped cross section rather than a U-shaped cross section, the frame 7 of the I-shaped cross section entails approximately twice as high manufacturing cost as the frame 7 of the U-shaped cross section, thus developing a problem of increased cost.

SUMMARY OF THE INVENTION

The invention has been made in consideration of these situations. Accordingly, it is an object of the invention to provide airfoil structures of composite material which make it possible to reduce the number of principal constituent components and assembling components to thereby achieve cost reduction, as well as methods of forming such airfoil structures.

A composite material airfoil structure of the invention comprises a composite material skin which forms one of top and bottom surfaces of an airfoil, a second composite material skin which forms the other of the top and bottom surfaces of the airfoil, a composite material spar having flanges and a web which together form a U-shaped cross section, the spar being attached to at least one terminal portion of the skins, composite material ribs and an elongate projection for adhesive bonding of the spar, the ribs and elongate projection being located between the skins, wherein the ribs and elongate projection are formed integrally with at least one of the skins. In this airfoil structure, it becomes possible to reduce the number of principal constituent components and thereby achieve cost reduction. Furthermore, by bonding the individual flanges of the spar to individual skin members, it becomes possible to obtain a peeling strength equivalent to that achieved when using a spar having an I-shaped cross section even when the spar having the U-shaped cross section is used to achieve cost reduction.

In a composite material airfoil structure of the invention, the ribs and elongate projection are formed integrally with one skin and their extreme ends are bonded to the other skin. In this airfoil structure, the construction of the skin having no ribs or elongate projection is simplified and it becomes possible to reduce manufacturing costs.

In a composite material airfoil structure of the invention, the ribs and elongate projection are formed integrally with each skin and their extreme ends are bonded to one another. In this airfoil structure, dimensions of the ribs and elongate projection rising out of each skin are reduced and it becomes possible to improve the overall strength of each skin one-piece formed with the ribs and elongate projection.

A method of forming a composite material airfoil structure of the invention comprises a molding process in which a first composite material skin which forms one surface of an airfoil and a second composite material skin which has ribs and an elongate projection integrally formed on an inner surface and forms the other surface of the airfoil are separately formed, and a bonding process in which bonding between extreme ends of the ribs and elongate projection and the first skin, bonding between individual flanges of a spar and the individual skins, and bonding between a web of the spar and the elongate projection are simultaneously done by using an adhesive to thereby form a single structure. This method makes it possible to reduce the number of principal constituent components and thereby achieve cost reduction. It also becomes possible to reduce the manufacturing costs as it is not necessary to use fasteners, for instance.

In a method of forming a composite material airfoil structure, the first skin is formed by laminating composite material prepreg on a mold base having the same outer contours as the airfoil, placing a foam core covered with a glue film on an upper surface of the prepreg, laminating again composite material prepreg on top, and hardening an entire assembly by thermosetting operation. Since this method uses the foam core as core material, pressures are uniformly allocated during a hardening process unlike the case in which an anisotropic core material like a honeycomb panel is used. Thus, it becomes possible to reduce deformation during the thermosetting operation.

In a method of forming a composite material airfoil structure, the second skin is formed by laminating composite material prepreg on a mold base having the same outer contours as the airfoil, placing a foam core covered with a glue film on the upper surface of the prepreg, laminating again composite material prepreg on top, placing an intra-projection foam core covered with a glue film on top, laminating again composite material prepreg on top, placing intra-rib foam cores covered with a glue film on top, laminating yet again composite material prepreg on top, and then hardening an entire assembly by thermosetting operation. Since this method uses the foam cores as core material, deformation is reduced even when the second skin and the ribs and elongate projection are one-piece molded. It also becomes possible to reduce the number of principal constituent components by one-piece molding the second skin with the ribs and elongate projection.

A method of forming a composite material airfoil structure of the invention comprises a molding process in which a first composite material skin which forms one surface of an airfoil and a second composite material skin which has ribs and an elongate projection integrally formed on an inner surface and forms the other surface of the airfoil are separately formed, and a bonding process in which bonding between extreme ends of ribs and elongate projections of the individual skins, bonding between individual flanges of a spar and the individual skins, and bonding between a web of the spar and the elongate projections are simultaneously done by using an adhesive to thereby form a single structure. This method makes it possible to reduce the number of principal constituent components and thereby achieve cost reduction. It also becomes possible to reduce the manufacturing costs as it is not necessary to use fasteners, for instance. Furthermore, since the ribs and elongate projection are integrally formed in halves on each skin, their dimensions rising out of each skin are reduced and it becomes possible to improve the overall strength of each skin one-piece formed with the ribs and elongate projection.

In a method of forming a composite material airfoil structure, each of the first and second skins is formed by laminating composite material prepreg on a mold base having the same outer contours as the airfoil, placing a foam core covered with a glue film on the upper surface of the prepreg, laminating again composite material prepreg on top, placing an intraprojection foam core covered with a glue film on top, laminating again composite material prepreg on top, placing intra-rib foam cores covered with a glue film on top, laminating yet again composite material prepreg on top, and then hardening an entire assembly by thermosetting operation. Since this method uses the foam cores as core material, it becomes possible to reduce deformation during the thermosetting operation even when the ribs and elongate projection are one-piece molded with each skin member.

In a method of forming a composite material airfoil structure, pressure plates are placed at least on end surfaces of the ribs and elongate projection prior to the thermosetting operation, the pressure plates having shapes corresponding to the shapes of mating bond surfaces. This arrangement eliminates the need to adjust the mating surfaces one by one when bonding the two skins to each other and makes it possible to simplify mismatch correction.

In a method of forming a composite material airfoil structure, a pasty thermosetting adhesive is used as the adhesive. As a consequence, a gap, whichever created between bond surfaces, is filled with the adhesive as long as the gap is about 2 mm wide or less, and it becomes possible to prevent a reduction in strength almost completely.

BRIEF DESCRIPTION OF THE DRAWINGS

FIGS. 22a–22b is a diagram showing stresses exerted on adhesively bonded joints between a frame having a U-shaped cross section and a skin; and FIGS. 23a–23b is a diagram showing stresses exerted on adhesively bonded joints between a frame having an I-shaped cross section and a skin.

DESCRIPTION OF THE PREFERRED EMBODIMENTS

Figure 1:
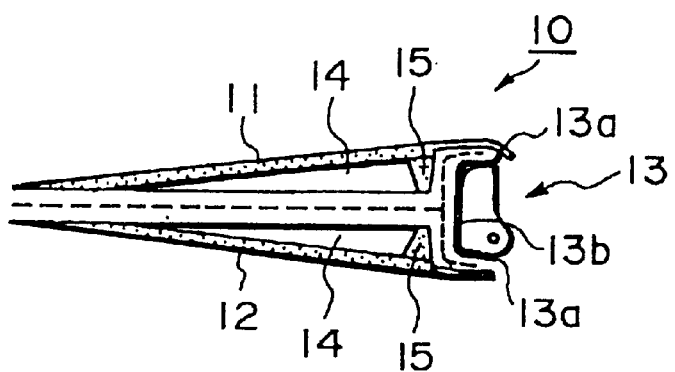
FIG. 1 is a cross-sectional structural diagram of a box-structure airfoil according to a first embodiment of the invention.

Modes of carrying out the invention, or embodiments thereof, are described below referring to the drawings.

Figure 2:
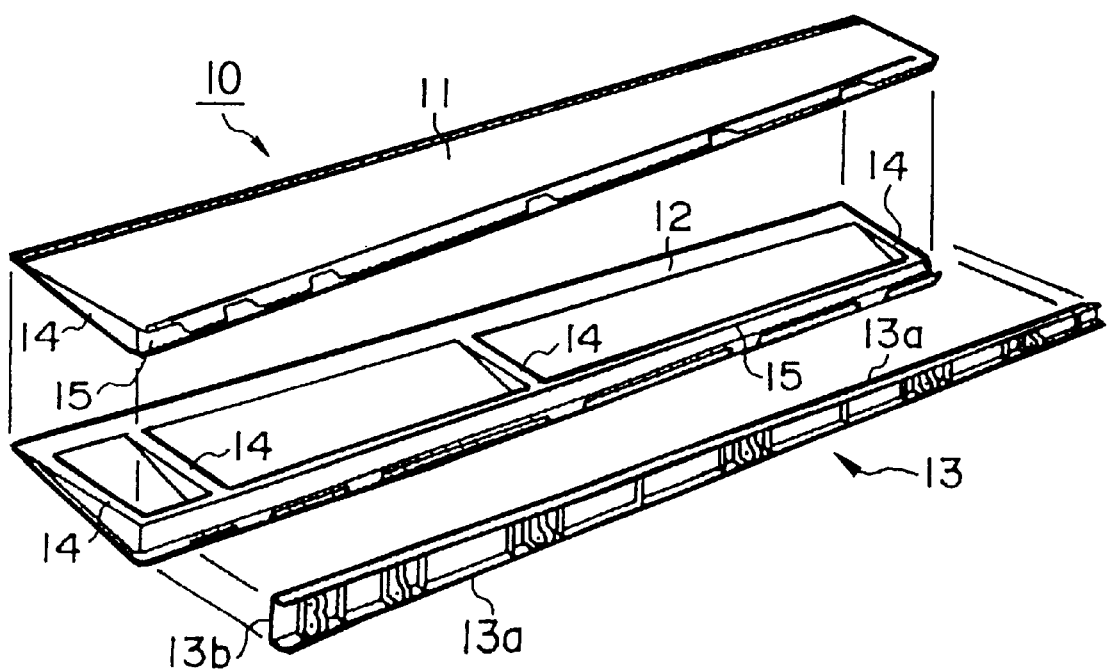
FIG. 2 is an exploded perspective diagram of the box-structure airfoil of FIG. 1.
Figure 3:
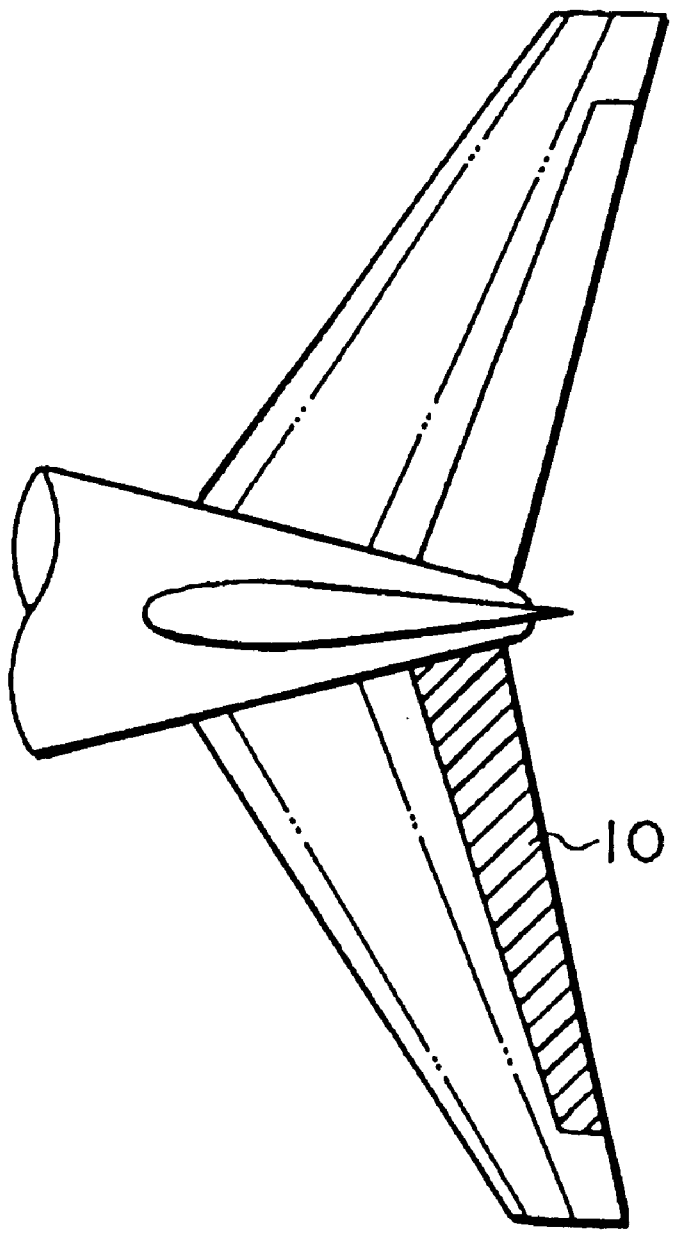
FIG. 3 is a diagram showing a location where the box-structure airfoil of FIG. 1 is applied.

FIGS. 1 and 2 show a box-structure airfoil using composite materials according to a first embodiment of the invention. This box-structure airfoil 10 is used as an elevator of an aircraft as shown in FIG. 3.

The box-structure airfoil 10 comprises a composite material upper skin 11 forming a top surface of the airfoil, a composite material lower skin 12 forming a bottom surface of the airfoil, and a composite material spar 13 attached to an extreme forward portion of the airfoil as shown in FIGS. 1 and 2, in which four ribs 14, for instance, and an elongate projection 15 for adhesive bonding of the spar 13 are formed integrally on the inner surface of each skin 11, 12. Both skins 11, 12 and the spar 13 are bonded by a pasty thermosetting adhesive to together form a single structure.

Figure 4:
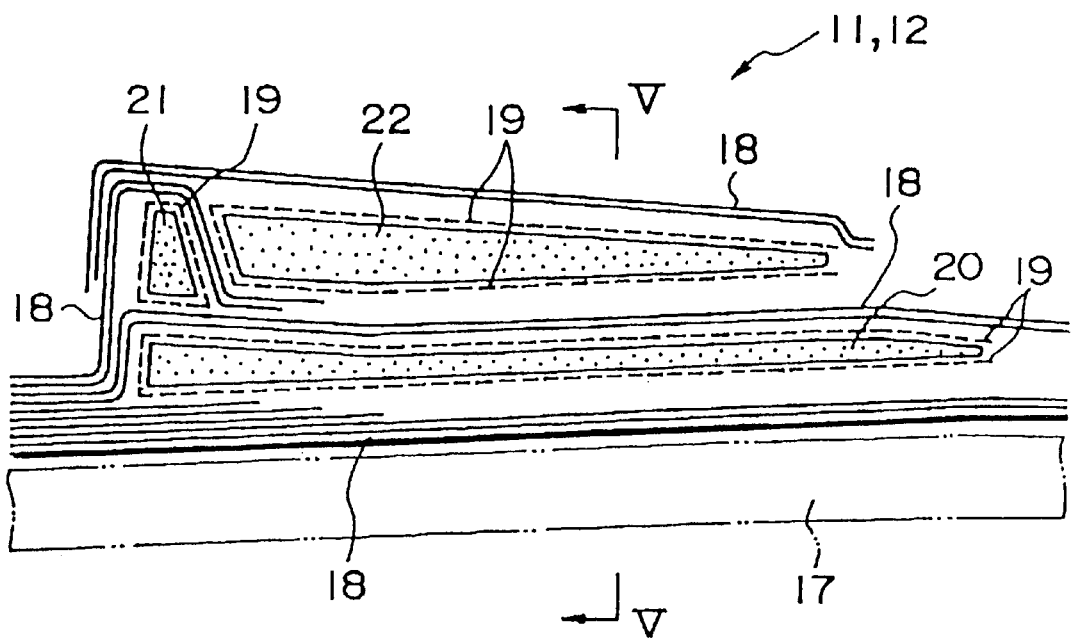
FIG. 4 is a diagram showing a method of forming a skin member.
Figure 5:
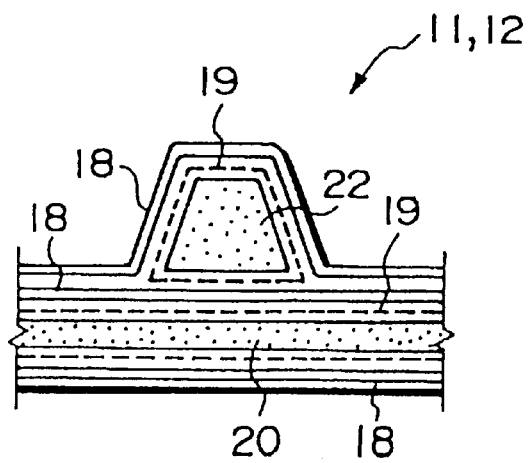
FIG. 5 is a cross-sectional diagram taken along lines V—V of FIG. 4.

As shown in FIGS. 4 and 5, each of the skins 11, 12 is formed by laminating composite prepreg 18 like a thermosetting carbon-fiber reinforced plastic (CFRP), for instance, on a steel skin forming jig 17 having a surface corresponding to the outer contours of the airfoil, placing an intra-skin foam core 20 whose outer surface is covered with a glue film 19 like a thermosetting film, for instance, on the upper surface of the composite prepreg 18 laminate, laminating again composite prepreg 18 on top, placing an intra-projection foam core 21 covered with a glue film 19 on top, laminating again composite prepreg 18 on top, placing intra-rib foam cores 22 covered with a glue film 19 on top, laminating yet again composite prepreg 18 on top, and then hardening the entire assembly by application of heat.

It is advisable to use a product known by the trade mark ROHACELL of Rohm Co., Ltd. of Germany that is made up of polymethacrylic imide which provides excellent heat resistance as the foam cores.

The individual foam cores 20, 21, 22 used are foam cores which have been subjected to postcuring operation (one form of heat treatment) to reduce deformation which may occur while they are molded under heat. The intra-projection foam core 21 and the intra-rib foam cores 22 are formed into a rodlike structure having a trapezoidal cross section as shown in FIGS. 4 and 5. These foam cores 21, 22 improve overall strength as they are combined with the intra-skin foam core 20 and prevent stress concentration.

The skins 11, 12 thus formed are set such that end surfaces of their ribs 14 and elongate projections 15 align face to face, and joined together using the adhesive, as shown in FIGS. 1 and 2.

The spar 13 is made up of flanges 13a located on both sides and a web 13b which together form a U-shaped cross section as shown in FIGS. 1 and 2. The flanges 13a on both sides are bonded to the individual skins 11, 12 by the adhesive. The web 13b is bonded to the elongate projections 15 of both skins 11, 12 by the adhesive. With this adhesive bond construction, an adhesive strength equivalent to the adhesive strength achieved by a spar having an I-shaped cross section is obtained by using the spar 13 of the U-shaped cross section.

The spar 13 is produced by laminating composite prepreg like thermosetting CFRP, for instance, shaping the composite prepreg laminate into a U-shaped cross section, and then hardening it by heat.

Next, an airfoil forming method according to the present embodiment is described.

In the manufacture of the box-structure airfoil 10, the upper skin 11, the lower skin 12 and the spar 13 are formed individually.

In forming each skin 11, 12, the composite prepreg 18 like a 180° C.-hardening CFRP, for instance, is laminated on the skin forming jig 17 having a surface corresponding to the outer contours of the airfoil, the intra-skin foam core 20 whose outer surface is covered with the glue film 19 like a 180° C.-hardening film, for instance, is placed on the upper surface of the composite prepreg 18 laminate, and the composite prepreg 18 is laminated again on top as shown in FIGS. 4 and 5. The skins are formed in this manner.

Subsequently, the intra-projection foam core 21 is covered with the glue film 19 and placed on the upper surface, and the composite prepreg 18 is laminated again on top. Consequently, the elongate projection 15 is formed.

Further, the intra-rib foam cores 22 are covered with the glue film 19 and placed on the upper surface, and the composite prepreg 18 is laminated yet again on top. Consequently, the ribs 14 are formed.

Figure 6:
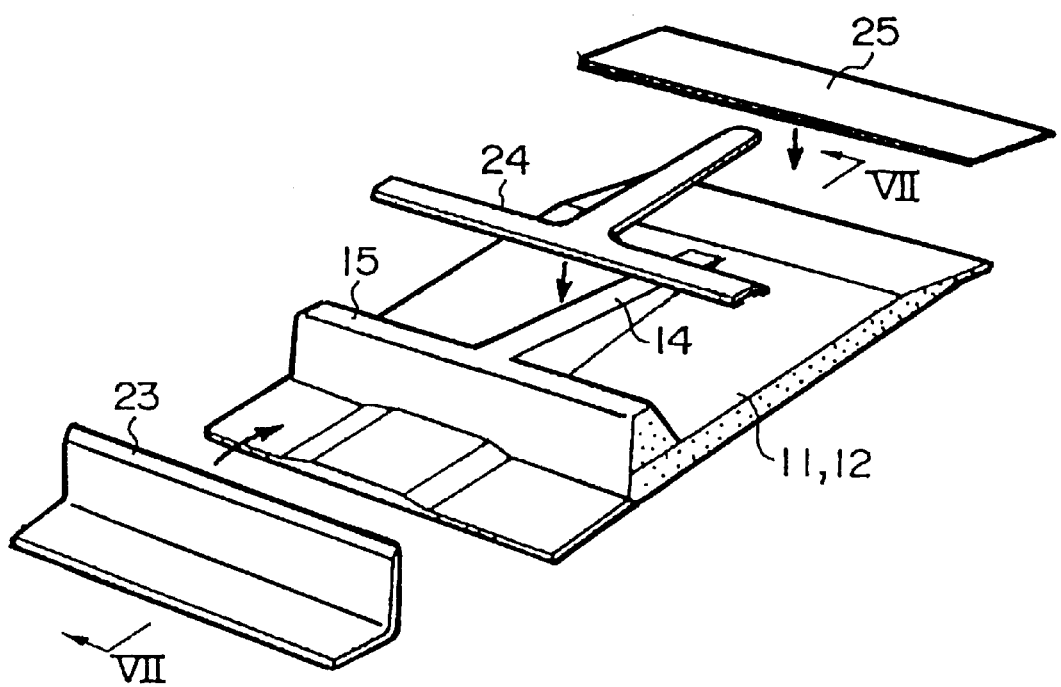
FIG. 6 is a diagram showing locations of molding jigs and a caul plate fitted to skins prior to thermosetting operation.
Figure 7:
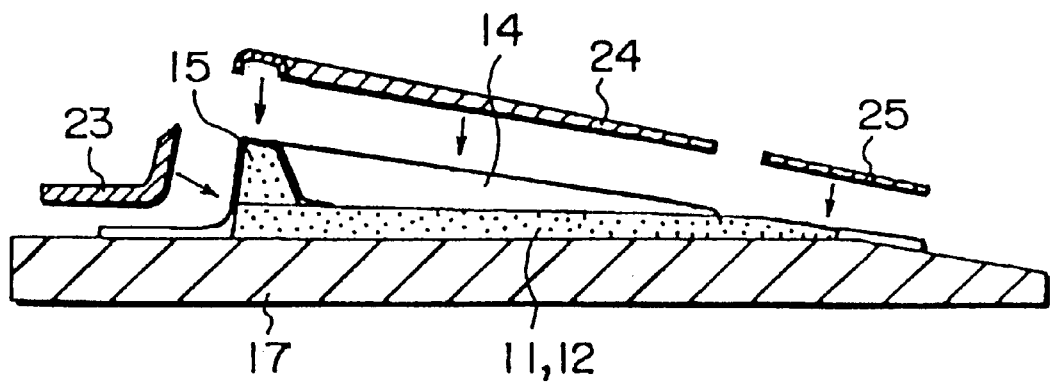
FIG. 7 is a cross-sectional diagram taken along lines VII—VII of FIG. 6.
Figure 8:
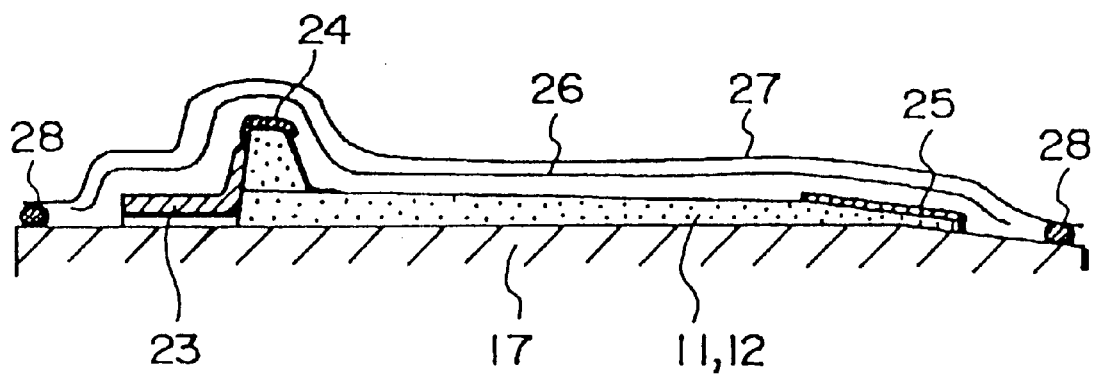
FIG. 8 is a diagram showing a skin which is subjected to the thermosetting operation with the molding jigs and caul plate set in position.

On the laminated assembly thus obtained, a jig 23 made of steel, for instance, for keeping a surface to be bonded to the spar 13 in flat shape is placed at the front side of the elongate projection 15, a jig 24 made of CFRP, for instance, for keeping skin bonding surfaces in flat shape is placed on the end surfaces of the ribs 14 and elongate projections 15, and a caul plate 25 made of aluminum, for instance, for forming a trailing edge flat surface is placed at the rear end of the laminated assembly, as shown in FIGS. 6 to 8. The entire assembly is then covered with bleeder cloth 26 and a back pack 27 and bagging is done by sealing a gap between the periphery of the back pack 27 and the skin forming jig 17 with a sealing material 28. Then, each skin 11, 12 is molded under heat at a temperature of 180° C. under a pressure of 3.2 atmospheres in an autoclave.

On the other hand, the spar 13 is formed as follows. Composite prepreg formed of a thermosetting CFRP, for instance, is laminated and a resultant laminate, formed into a U-shaped cross-sectional shape, is molded under heat at a temperature of 180° C. under a pressure of 3.2 atmospheres in the autoclave to produce the spar 13.

Figure 9:
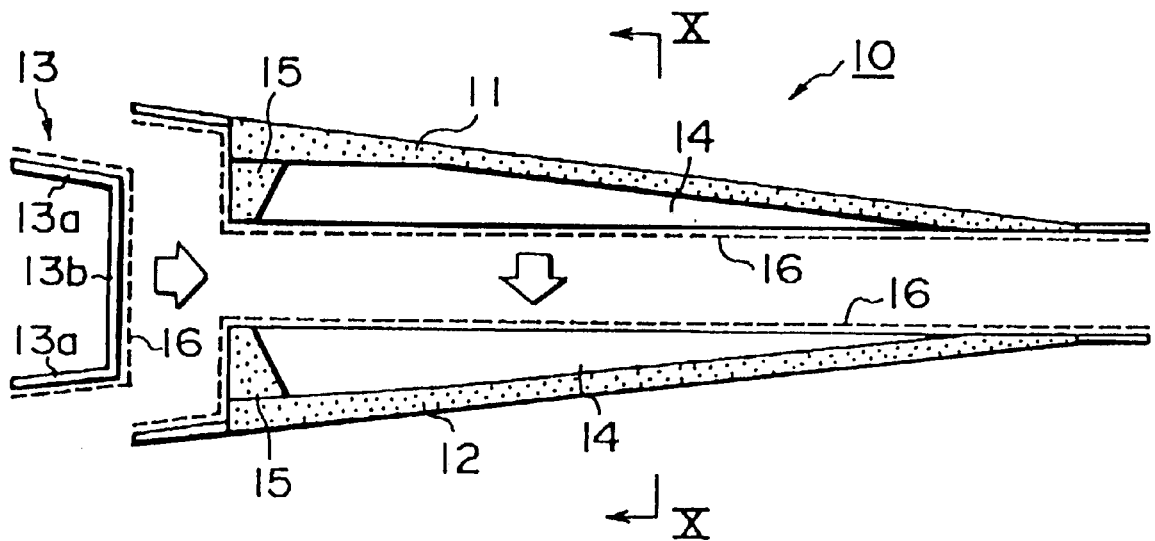
FIG. 9 is a diagram showing a method of bonding the two skins and a spar.
Figure 10:
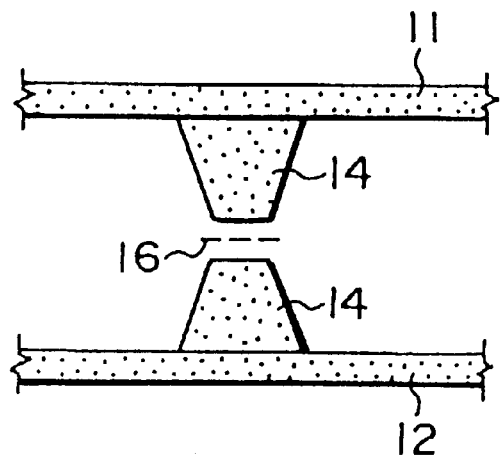
FIG. 10 is a cross-sectional diagram taken along lines X—X of FIG. 9.

When the individual skins 11, 12 and the spar 13 have been formed in the aforementioned manner, a pasty thermosetting adhesive 16 (which cures at 120° C., for example) is applied to bond surfaces of the two skins 11, 12 and those of the spar 13, and the same adhesive 16 is applied to outer surfaces of the two flanges 13a and the web 13b of the spar 13 as shown in FIGS. 9 and 10. Then, these components are bonded simultaneously to together form a single structure.

Figure 11:
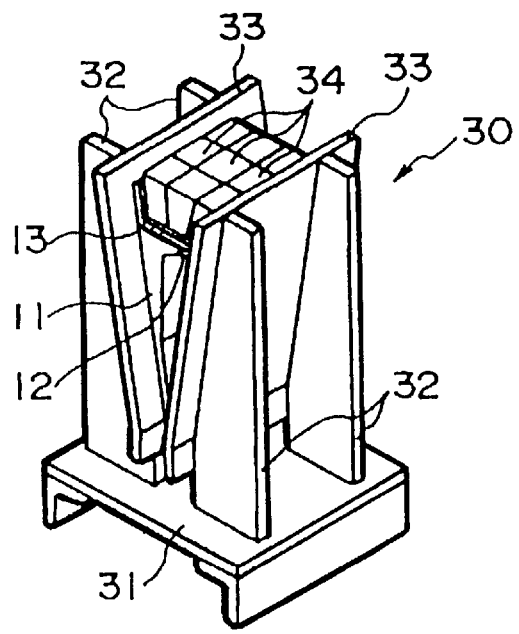
FIG. 11 is a perspective diagram showing a status in which the airfoil has been set in a bonding jig, which is used when bonding the box-structure airfoil, for carrying out a bonding operation.
Figure 12:
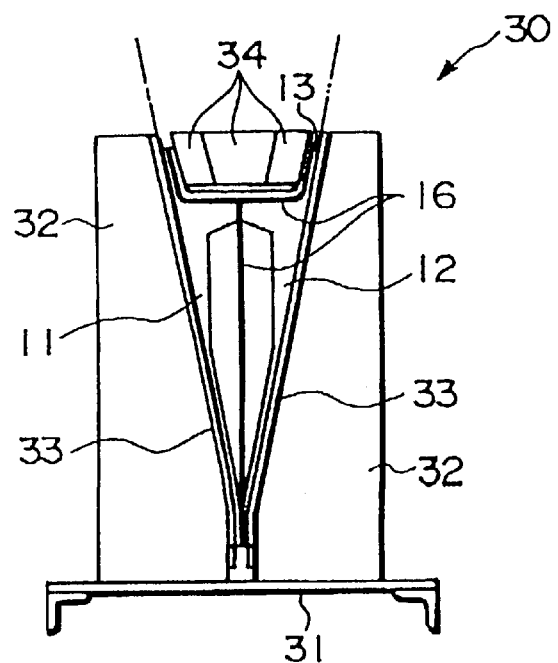
FIG. 12 is a vertical cross-sectional diagram taken from FIG. 11.

FIGS. 11 and 12 show an example of a bonding jig used for bonding operation, in which the bonding jig 30 has a base 31, a pair of face plates 33 mounted on the base 31 by supports 32, together forming a V shape, and wedge-shaped load application blocks 34. The two skins 11, 12 and the spar 13 to which the adhesive 16 has been applied are inserted into a space between the two face plates 33 from above in a temporarily bonded condition and pressed by the load application blocks 34 placed on the spar 13. The skins 11, 12 and the spar 13 are bonded to form the single structure as they are heated at a temperature of 120° C. under pressure exerted by the blocks 34.

Because the ribs 14 and the elongate projection 15 are formed as integral part of each skin 11, 12 as described above, the number of principal constituent components is reduced. Since the assembling components like fasteners are not required as a consequence, it is possible to achieve cost reduction.

Furthermore, since the foam cores 20, 21, 22 having isotropic mechanical properties are used as core material and these foam cores are postcured, it is possible to reduce deformation which may occur while they are molded under heat even when each skin 11, 12 is one-piece molded together with the ribs 14 and the elongate projection 15.

Also, because the jigs 23, 24 and the caul plate 25 are placed on the adhesive bond areas of each skin 11, 12 prior to their molding operation under heat, it is possible to significantly improve the accuracy of their bond surfaces. In particular, it become no longer necessary to adjust mating surfaces of the individual ribs 14 one by one in adhesive assembly operation and this serves to simplify mating surface adjustment.

In addition, since the spar 13 is formed into a U-shaped cross-sectional shape, it can be produced at a lower cost compared to those having an I-shaped cross section. Moreover, since not only the web 13b but also the flanges 13a on both sides of the spar 13 are bonded to the respective skins 11, 12, it is possible to obtain an adhesive strength equivalent to the adhesive strength achieved by the spars having the I-shaped cross section.

Figure 13:
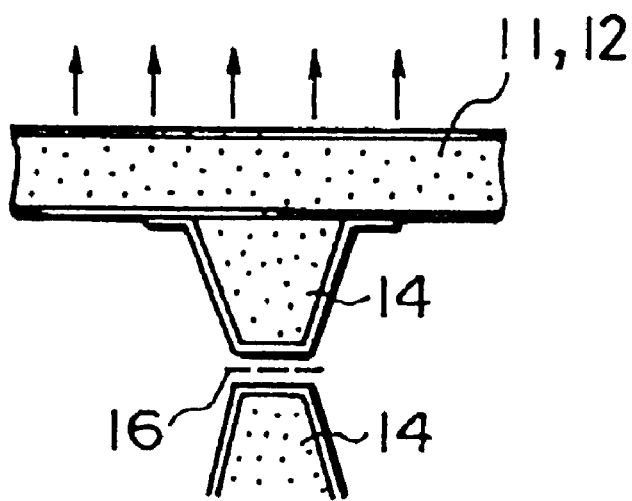
FIGS. 13a–13b is a diagram showing stresses exerted on ribs having a trapezoidal cross section.
Figure 13:
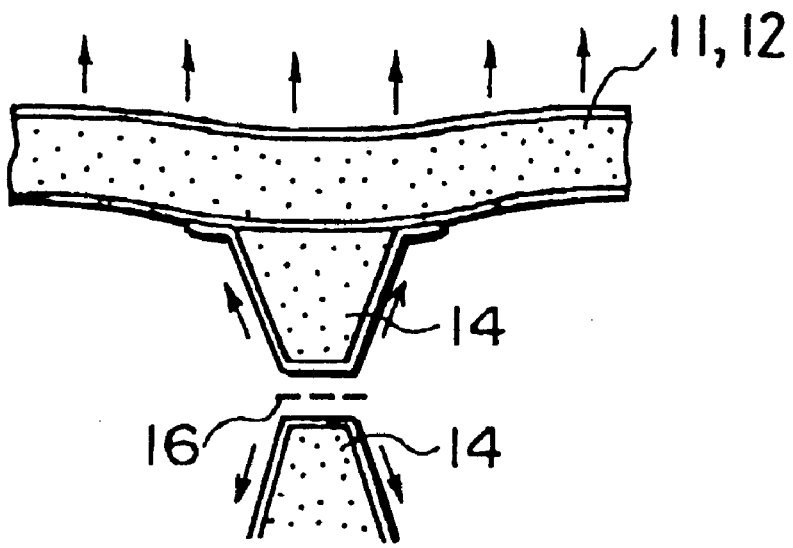

Furthermore, because the individual ribs 14 have a trapezoidal cross section as shown in FIGS. 13(a) and 13(b), their left and right inclined surfaces can evenly support a peeling load. Due to this trapezoidal cross-sectional shape, combined with the fact that the individual skins 11, 12 has high stiffness and the amount of their deformation is small, it is possible to alleviate stress concentration. Moreover, although the extreme end surfaces of the ribs 14 of the individual skins 11, 12 are bonded face to face, it is possible to obtain a sufficient peeling strength since the peeling load is evenly supported by the left and right inclined surfaces of each rib 14.

Figure 14:
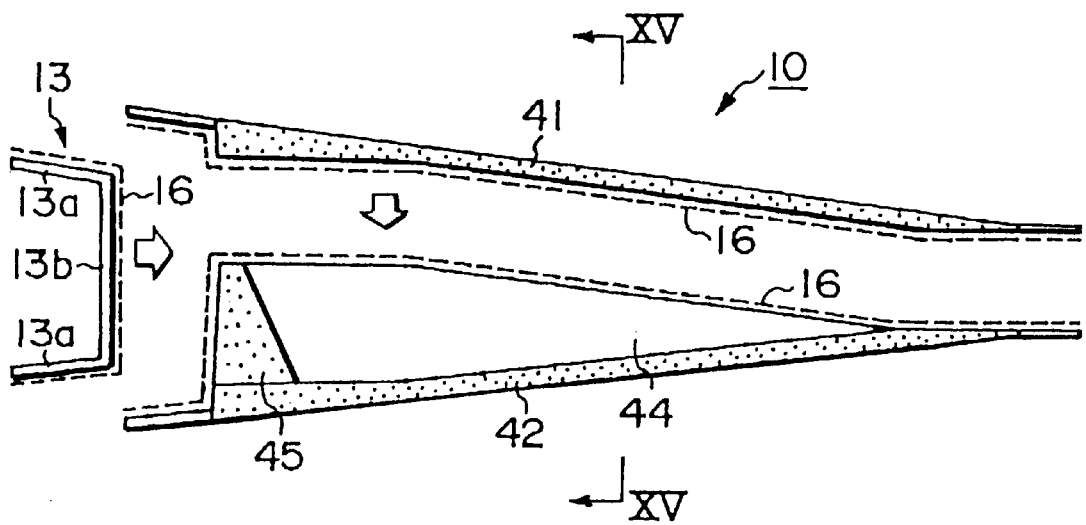
FIG. 14 is a diagram corresponding to FIG. 9 showing a second embodiment of the invention.
Figure 15:
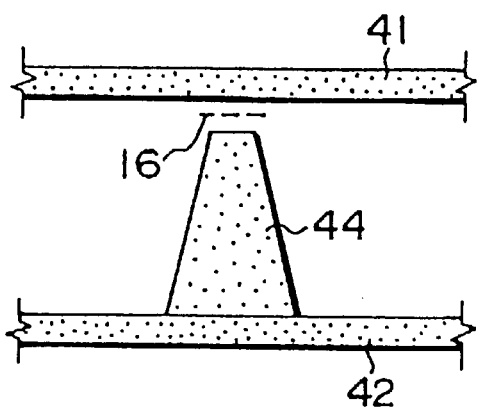
FIG. 15 is a cross-sectional diagram taken along lines XV—XV of FIG. 14.

FIGS. 14 and 15 are diagrams showing a second embodiment of the invention, in which the upper skin 11 and the lower skin 12 of the first embodiment are replaced by an upper skin 41 and a lower skin 42.

More particularly, the upper skin 41 is constructed of a skin portion alone, while the lower skin 42 is constructed of a skin portion and large-sized ribs 44 and elongate projection 45 which are one-piece formed with the skin portion, as shown in FIGS. 14 and 15.

This embodiment otherwise has the same construction and functional features as the earlier-described first embodiment.

Although the ribs 44 and elongate projection 45 of the lower skin 42 are large-sized compared to those of the first embodiment, the present embodiment has an advantage over the first embodiment in terms of cost when applied to a box-structure airfoil 10 having a relatively small thickness, because it is advantageous in that the upper skin 41 is made into a simple shape.

Figure 16:
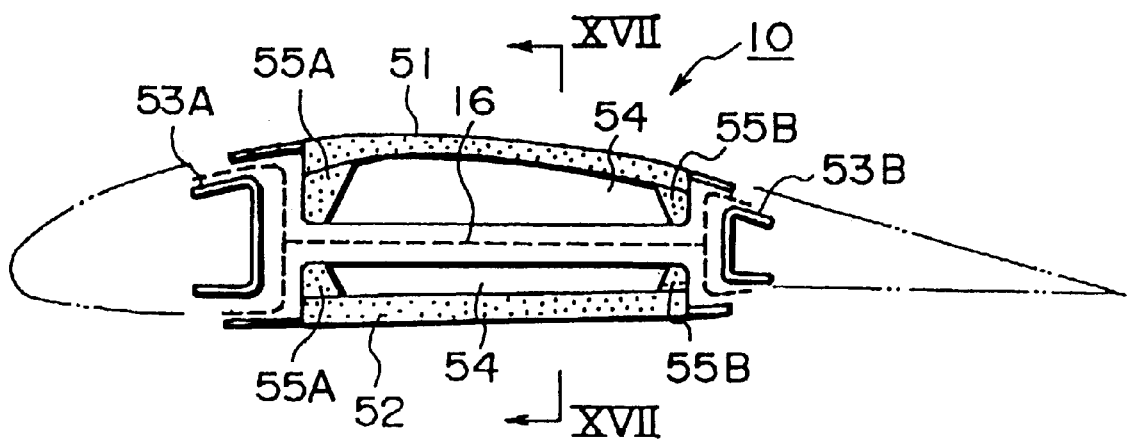
FIG. 16 is a diagram corresponding to FIG. 1 showing a third embodiment of the invention.
Figure 17:
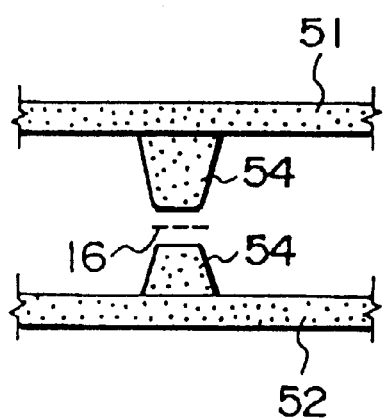
FIG. 17 is a cross-sectional diagram taken along lines XVII—XVII of FIG. 16.
Figure 18:
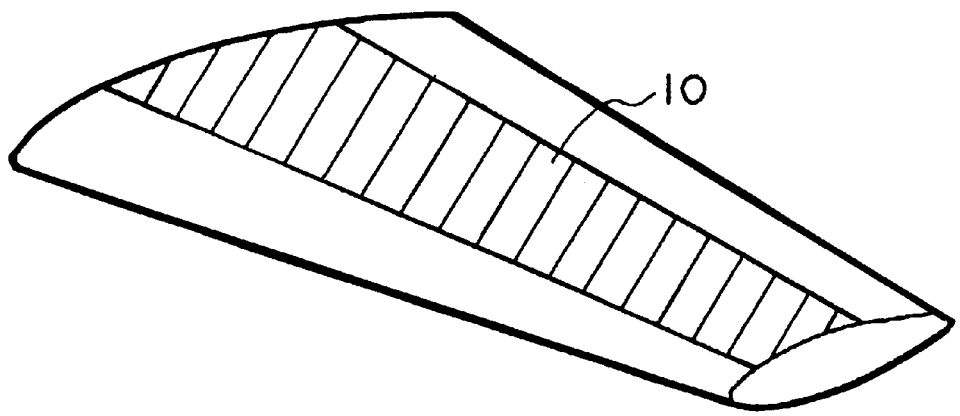
FIG. 18 is a diagram showing a location where a box-structure airfoil of FIG. 16 is applied.
Figure 19:
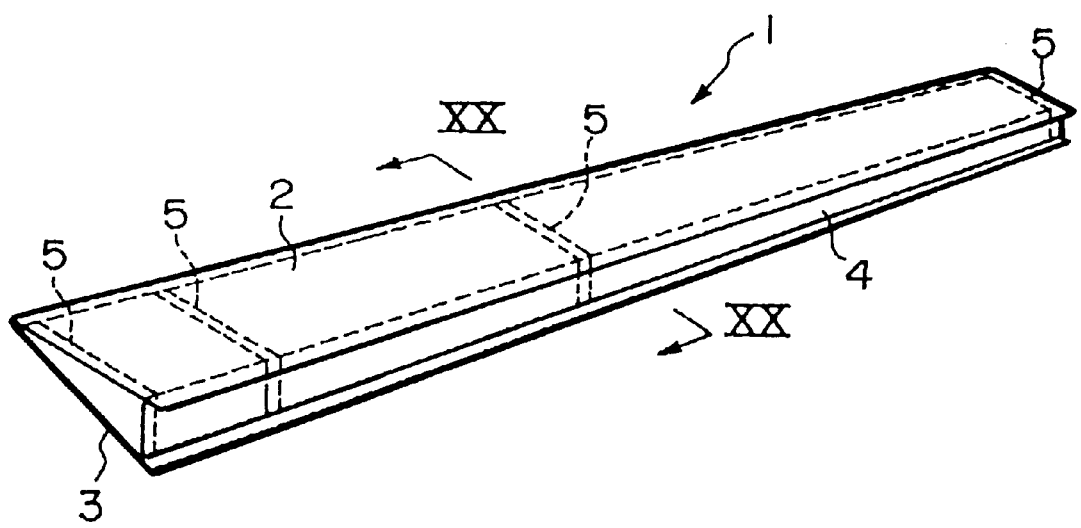
FIG. 19 is a perspective diagram showing the construction of an elevator of a related art aircraft of composite material.
Figure 20:
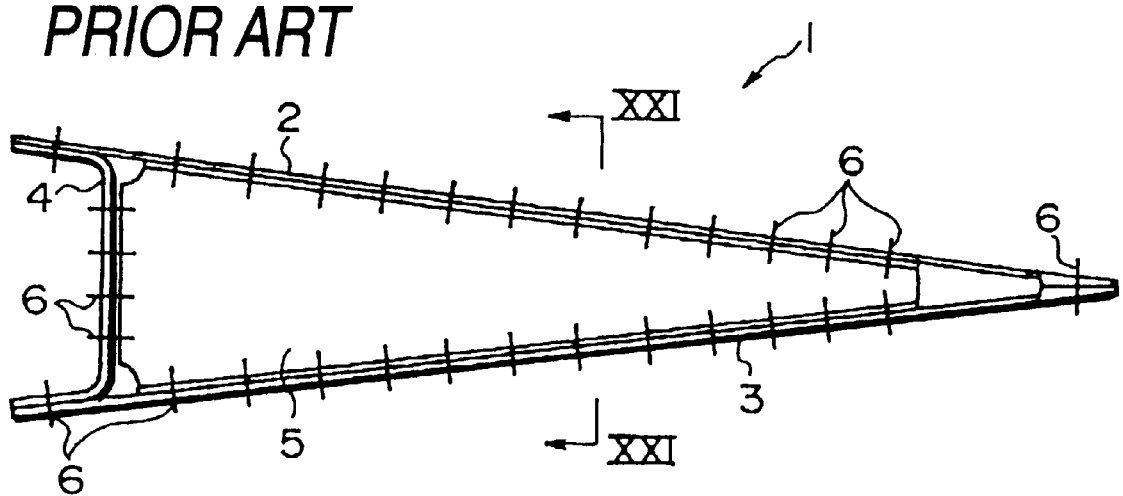
FIG. 20 is an enlarged cross-sectional diagram taken along lines XX—XX of FIG. 19.
Figure 21:
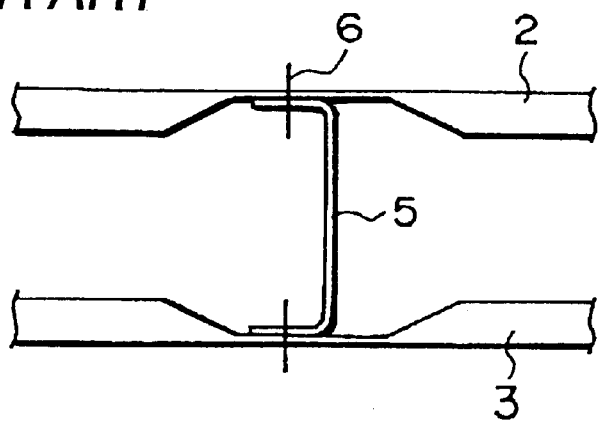
FIG. 21 is an enlarged cross-sectional diagram taken along lines XXI—XXI of FIG. 20.

FIGS. 16 to 18 are diagrams showing a third embodiment of the invention which is so configured that a box-structure airfoil 10 can be used as a horizontal stabilizer of an aircraft.

More particularly, this box-structure airfoil 10 is constructed of an upper skin 51, a lower skin 52, a front spar 53A and a rear spar 53B, in which ribs 54, a front elongate projection 55A for bonding the front spar 53A and a rear elongate projection 55B for bonding the rear spar 53B are formed integrally on the inner surface of each skin 51, 52, as shown in FIG. 16.

This embodiment otherwise has the same construction and functional features as the earlier-described first embodiment.

In the light of the foregoing discussion, it is expected that this embodiment provides the same advantageous effects as the earlier-described first embodiment.

Since ribs and elongate projection are one-piece molded together with a skin member in this invention as thus far described, it is possible to reduce the number of principal constituent components as well as the number of assembling components like fasteners. As a consequence, it is possible to achieve cost reduction. Further, since individual flanges of a spar are bonded to individual skin members, it is possible to obtain a peeling strength equivalent to that achieved when using a spar having an I-shaped cross section even when the spar having a U-shaped cross section is used to achieve cost reduction.

In this invention, the ribs and elongate projection are formed integrally with one skin and their extreme ends are bonded to the other skin. Therefore, the shape of the second skin can be simplified and, in particular, it is possible to achieve cost reduction when the invention is applied to a box-structure airfoil having a small thickness.

In this invention, the ribs and elongate projection are formed integrally with each skin and their extreme ends are bonded to one another. This makes it possible to reduce dimensions of the ribs and elongate projection rising out of each skin even when the invention is applied to a box-structure airfoil having a large thickness. Furthermore, such skins are easy to manufacture and it is possible to improve the overall strength of each skin as it is one-piece formed with the ribs and elongate projection.

In this invention, a box-structure airfoil is manufactured by a molding process in which a spar and individual skin members are separately formed and a bonding process in which bonding between extreme ends of the ribs and elongate projection and the first skin member, bonding between individual flanges of the spar and the individual skins, and bonding between a web of the spar and the elongate projection are simultaneously done by using an adhesive to thereby form a single structure. This makes it possible to reduce the number of principal constituent components as well as the number of assembling components like fasteners and thereby achieve cost reduction.

In this invention, the first skin is formed by laminating composite material prepreg on a mold base having the same outer contours as the airfoil, placing a foam core covered with a glue film on an upper surface of the prepreg, laminating again composite material prepreg on top, and hardening an entire assembly by thermosetting operation. By using the foam core as core material, pressures are uniformly allocated during a hardening process unlike the case in which an anisotropic core material like a honeycomb panel is used. Furthermore, since the foam core is covered with the glue film, it is possible to improve adhesion between the foam core and the prepreg.

In this invention, the second skin is formed by laminating composite material prepreg on a mold base having the same outer contours as the airfoil, placing a foam core covered with a glue film on the upper surface of the prepreg, laminating again composite material prepreg on top, placing an intra-projection foam core covered with a glue film on top, laminating again composite material prepreg on top, placing intra-rib foam cores covered with a glue film on top, laminating yet again composite material prepreg on top, and then hardening an entire assembly by thermosetting operation. According to this arrangement, the second skin is one-piece molded with the ribs and elongate projection, making it possible to reduce the number of principal constituent components.

In this invention, a box-structure airfoil is manufactured by a molding process in which a spar and individual skins are separately formed, and a bonding process in which bonding between extreme ends of ribs and elongate projections of the individual skins, bonding between individual flanges of the spar and the individual skins, and bonding between a web of the spar and the elongate projections of both skins are simultaneously done by using an adhesive to thereby form a single structure. Since the ribs and elongate projection are integrally formed in halves on each skin, their dimensions rising out of each skin are reduced even when the box-structure airfoil is of a type having a large thickness. Furthermore, the individual skins can be easily formed and it is possible to improve the overall strength of each skin as it is one-piece formed with the ribs and elongate projection.

In this invention, each of the first and second skins is formed by laminating composite material prepreg on a mold base having the same outer contours as the airfoil, placing a foam core covered with a glue film on the upper surface of the prepreg, laminating again composite material prepreg on top, placing an intra-projection foam core covered with a glue film on top, laminating again composite material prepreg on top, placing intra-rib foam cores covered with a glue film on top, laminating yet again composite material prepreg on top, and then hardening an entire assembly by thermosetting operation. According to this arrangement, it is possible to reduce deformation during the thermosetting operation even when the ribs and elongate projection are one-piece molded with each skin.

In this invention, pressure plates are placed at least on end surfaces of the ribs and elongate projection prior to the thermosetting operation, the pressure plates having shapes corresponding to the shapes of mating bond surfaces. This arrangement eliminates the need to adjust the mating surfaces one by one when bonding the two skins to each other and makes it possible to simplify mismatch correction.

Since a pasty thermosetting adhesive is used as the adhesive in this invention, a gap, whichever created between bond surfaces, is filled with the adhesive and this makes it possible to prevent a reduction in strength almost completely.

While presently preferred embodiments of the present invention have been shown and described in detail, it will be understood that these disclosures for the purpose of illustration and that various changes and modifications can be made therein without departing from the spirit and scope of the invention as set forth in the appended claims.

What is claimed is:

1. An airfoil structure made from a composite material, having, an upper skin made from said composite material for forming an upper contour of said airfoil structure and for extending in a chord length direction, a lower skin made from said composite material for forming a lower contour of said airfoil structure and for extending in said chord length direction, and a rib interposed between said upper and lower skins and arranged in said chord length direction for supporting thereof, comprising:

a spar interposed between said upper and lower skins at either one of edge portions thereof in said chord length direction and extended in a span-wise direction;

a web formed in said spar and being approximately perpendicular to said both skins for making a space therebetween;

a flange formed on both edge portions of said web for supporting said upper or lower skin so as to adequately and continuously mate with said upper or lower contour; and a protrusion integrally formed on said upper or lower skin for adhesively bonding said spar and said rib so as to effectively and economically maintain a sufficient strength against a peeling stress applied thereof.

2. A box-shaped wing airfoil structure having, an upper skin made of a composite material for forming an upper contour surface thereof, a lower skin made of said composite material for forming a lower contour surface thereof, and a spar made of said composite material and interposed between said upper and lower skins to extend in a spanwise direction of the wing airfoil structure, comprising:

flanges formed at both upper and lower edge portions of said spar and bonded to a lower surface of a front edge portion of said upper skin and to an upper surface of a front edge portion of said lower skin, respectively;

a web formed between rear edges of said flanges of said spar to provide the spar with a U-shaped cross-section opening forward and to define a rear surface of the spar;

a first elongated projection of said composite material, integrally formed with along a lower surface of the front edge portion of said upper skin and bonded to said rear surface of the spar;

a second elongated projection of said composite material, integrally formed with and along an upper surface of the front edge portion of said lower skin and bonded to said rear surface of the spar;

a plurality of first ribs of said composite material, formed integrally with both said upper skin and said first elongate projection and extending rearward from the first elongate projection said first ribs being disposed with intervals in said spanwise direction;

a plurality of second ribs formed integrally with both said lower skin and said second elongate projection and extending rearward from the second elongate projection, said second ribs being disposed with intervals in said spanwise direction; and said first elongate projection and said first ribs being bonded to said second elongate projection and said second ribs in a mutually confronting disposition;

whereby precise and easy assembly of the box-shaped wing airfoil structure at a low cost is enabled with a strong resistant strength against a peeling force applied thereof.

3. The box-shaped wing airfoil structure according to claim 2, wherein:

said first and second elongate projections have a trapezoidal cross-sectional shape.

4. The box-shaped wing airfoil structure according to claim 2, wherein:

said first and second ribs have a trapezoidal cross-sectional shape.

5. A box-shaped wing airfoil structure having, an upper skin made of a composite material for forming an upper contour surface thereof, a lower skin made of said composite material for forming a lower contour surface thereof, and a spar made of said composite material and interposed between said upper and lower skins to extend in a spanwise direction of the wing airfoil structure, comprising:

flanges formed at both upper and lower edge portions of said spar and bonded to a lower surface of a front edge portion of said upper skin and to an upper surface of a front edge portion of said lower skin, respectively;

a web formed between rear edges of said flanges of said spar to provide the spar with a U-shaped cross-section opening forward and to define a rear surface of the spar;

an elongate projection of said composite material, integrally formed with and along an upper surface of the front edge portion of said lower skin and bonded to said rear surface of the spar;

a plurality of ribs of said composite material, formed integrally with both said lower skin and said elongate projection and extending rearward from the second elongate projection, said ribs being disposed with intervals in said spanwise direction; and said elongate projection and said ribs being bonded to a lower surface of said upper skin in a confronting disposition;

whereby precise and easy assembly of the box-shaped wing airfoil structure at a low cost is enabled with a strong resistant strength against a peeling forced applied thereof.

6. The box-shaped wing airfoil structure according to claim 5, wherein:

said elongate projection has a trapezoidal cross-sectional shape.

7. The box-shaped wing airfoil structure according to claim 5, wherein:

said ribs has a trapezoidal cross-sectional shape.

* * * * *